Figure 1:
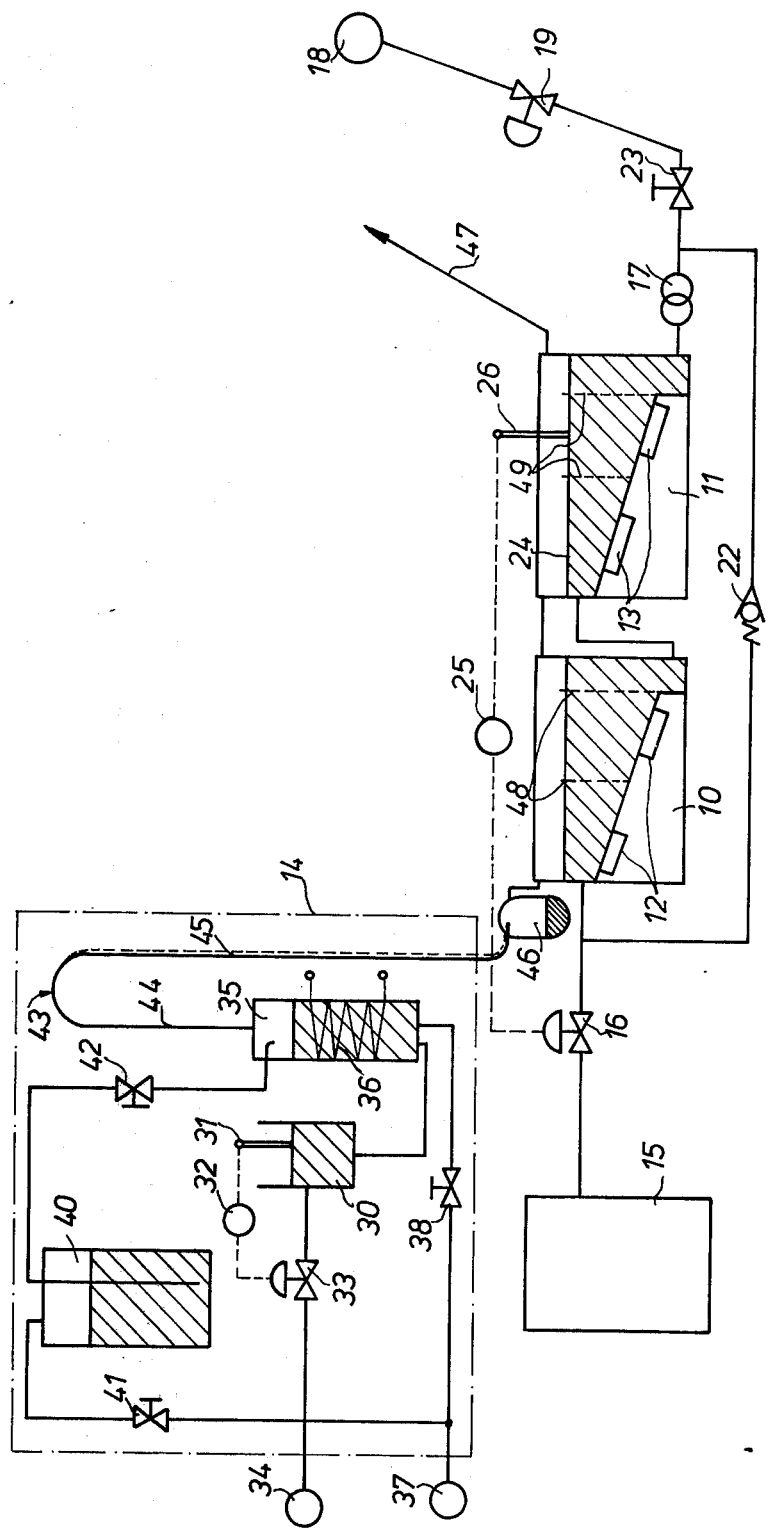

United States Patent [19]

Verhille

[11] 4,127,394

[45] Nov. 28, 1978

[54] METHOD AND APPARATUS FOR DEAERATION OF A LIQUID COMPOSITION

[75] Inventor: Karel E. Verhille, Hoboken, Belgium

[73] Assignee: AGFA-Gevaert N.V., Mortsel, Belgium

[21] Appl. No.: 805,019

[22] Filed: Jun. 9, 1977

[30] Foreign Application Priority Data

Jun. 11, 1976 [GB] United Kingdom ............... 24402/76

[51] Int. Cl.² ............................................. B01D 51/08
[52] U.S. Cl. ........................................... 55/15; 55/53; 55/87; 55/178; 55/277
[58] Field of Search ............................ 55/15, 38–44, 55/47, 51, 52–54, 55, 87, 178, 196, 198, 277

[56] References Cited

U.S. PATENT DOCUMENTS

| | | | |
|---|---|---|---|
| 1,365,791 | 1/1921 | Sadtler | 55/87 |
| 2,989,143 | 6/1961 | Hallstrom | 55/38 |
| 3,793,805 | 2/1974 | Hoffman | 55/52 |
| 3,853,500 | 12/1974 | Gassmann et al. | 55/15 |
| 3,926,664 | 12/1975 | Verreydt | 55/55 |

Primary Examiner—Bernard Nozick
Attorney, Agent, or Firm—William J. Daniel

[57] ABSTRACT

A method of deaerating a coating liquid, by subjecting said liquid to ultrasonic vibrations, and by continuously controlling the cushion of foam that is formed on said liquid as a result of the deaerating, by means of a vapor current to which at least one compound that has foam-stability reducing properties is added.

17 Claims, 2 Drawing Figures

METHOD AND APPARATUS FOR DEAERATION OF A LIQUID COMPOSITION

The present invention relates to a method and an apparatus for the continuous degasification, e.g. deaeration of a liquid composition, more specifically a liquid coating composition.

In the application of a coating to a support, gas-bubbles entrained in the coating composition should be completely eliminated prior to the application, since the gas-bubbles remain in the coated layer and form pinholes after drying. This defect is particularly critical in the manufacture of photographic light-sensitive material where projection or enlargement is necessary, as in cine-films of small format, or where photographic material must be absolutely free from any defect such as larger format film sheets for graphic and radiographic purposes.

In order to eliminate fine gas-bubbles contained in photographic coating compositions, it is known to expel said bubbles by means of vacuum boiling techniques. Such techniques offer very good results in practice but, unfortunately, they are costly as a consequence of the rather expensive vacuum pumps required for subjecting the coating composition to a high vacuum, and of the relative high consumption of electrical energy.

It is further known that ultrasonic waves exhibit a degasifying effect and therefore it has been proposed to use them for the degassing of photographic coating compositions. While the degassing effect as such is very satisfactory since pinholes and other defects that are due to the inclusion of gas bubbles in the coating composition may be satisfactorily avoided, the application of this ultrasonic technique is hampered by the formation of a cushion or a head of foam at the free surface of the body of liquid in the ultrasonic degasifying device. Such cushion of foam may assume a considerable volume, especially in the case of photographic coating compositions that contain various surface active chemicals, and that may have been subjected to mixing and other handling techniques causing the coating composition to become aerated.

If the cushion of foam is not removed, it progressively increases in size and may even solidify, and thereby may impair the further release of entrapped air and the proper functioning of level control means disposed in the ultrasonic deaerating chamber.

It is the aim of the present invention to provide a method and an apparatus for the ultrasonic degasification of a liquid composition, wherein the foam that is formed at the free surface of the liquid during the degasification is continuously controlled thereby to enable an unobstructed degasification for an unlimited period of time.

In accordance with the present invention, a method for continuously degasifying a liquid composition comprises the steps of:
  feeding the liquid composition through a degasifying chamber in amounts less than the volume of such chamber so that the upper surface of the composition is spaced away from the upper extremity of the chamber,
  subjecting said liquid composition while in said chamber to ultrasonic vibrations, thereby to move at least some of the entrained gas in the liquid composition upwardly towards the free surface of said composition in said chamber, and
  maintaining at the free surface of the liquid composition in said chamber a vapour current of at least one of the solvents contained in the liquid composition, said current containing at least one compound in vapour phase that has a foam-stability reducing power on the liquid composition foam that is formed at the free surface of the composition as a consequence of the ultrasonic treatment of said composition. The temperature of said vapour current should be such as to avoid undesirable cooling effects. Therefore the temperature of such current where it first flows into contact with the liquid composition should normally be at least equal to the temperature of the said composition at that place.

As the deaeration of liquids is mainly intended, this specification hereafter refers mainly to deaeration and deaeration equipment but the removal of gases other than air is within the scope of the invention.

In the performance of the method according to the present invention, there is no evaporation of the liquid contained in the cushion of foam on the liquid composition that is being deaerated, so that there occurs no drying or solidification of said foam cushion. On the contrary, there is a continuous dynamic equilibrium between new foam that is produced by new liquid composition that is being deaerated during its flow through the deaerating chamber, and foam that is being destroyed near the free surface of the cushion of foam as a consequence of the presence of the compound having a foam-stability reducing power on the produced foam. As this compound destroys the upper layers of the foam cushion, it migrates towards the lower layers of the foam cushion which in the meantime have risen as a consequence of the newly produced foam. Thus, there is an equilibrium between the concentration of the foam-stability reducing compound in the said vapour current and the concentration of that compound in the cushion of foam. Consequently, there is almost no contact of the described foam-destroying compound with the body of liquid composition in the chamber and experience has shown that the amount of said compound that is taken up by the composition in the chamber is negligibly small.

It has been found that the described dynamic equilibrium is substantially self-stabilising, and therefore it is not necessary in practice to add an exterior control to the process, that would for instance control the concentration of said at least one foam-stability reducing compound in said vapour current in order to maintain a given foam cushion thickness.

Preferably, the adjustment of the process occurs entirely empirically, in dependence on the foaming properties of a particular liquid composition that is to be deaerated.

A preferred adjustment is one in which the thickness of the cushion of foam is decreased but not reduced to zero in continuous operation, thereby to still maintain a separation in the form of a foam cushion, between the mentioned vapour current and the body of liquid composition.

According to a preferred embodiment of the method according to the present invention, the liquid composition is fed in succession through two degasifying chambers wherein the liquid composition takes a level such that the upper surface of the composition remains separated from the upper extremity of the chamber and wherein the liquid composition is subjected to ultrasonic vibrations, the mentioned vapour current is passed likewise in succession through both deaerating chambers, and the amount of the at least one foam reducing compound in the foam controlling current is such that the thickness of the cushion or the mushroom of foam that would be formed in the first chamber in the absence of such stream of gas mixture is decreased but not reduced to zero, and that the thickness of the cushion of foam in the second chamber is substantially reduced to zero. This preferred method of operation is very easy to set, even by a less skilled operator, and practice has shown that the satisfactory operation may continue for many weeks without any further adjustment.

Other preferred features, one or more of which may be employed in a method according to the invention are as follows.

The vapour current is saturated with water vapour. The temperature of the vapour current is between 5° and 25° C. higher than the temperature of the liquid composition in said chamber. The foam-stability reducing compound is ethyl alcohol or any other suitable aliphatic alcohol.

The present invention includes further also an apparatus for the continuous degasification of a liquid composition. Such an apparatus comprises:

at least one degasifying chamber provided with means for subjecting a liquid composition passing through said chamber to ultrasonic vibrations, thereby to move entrained gas upwardly in the liquid composition, level control means for controlling the level of the composition in said chamber in such a way that the upper surface of the liquid composition remains separated from the upper wall of the chamber, means for producing an atmosphere of at least one of the solvents contained in the liquid composition, means for adding to said atmosphere a compound that has a foam-stability reducing power on the said liquid composition foam, and means for passing over the free surface of said liquid composition in said chamber a current of said atmosphere with said foam-stability reducing compound added thereto.

The means for producing said atmosphere may comprise means for moistening pressurized air with water vapour to almost complete saturation at a first temperature that is higher than the temperature of the liquid composition in said degasifying chamber, injection means for injecting said compound that has a foam-stability reducing power into said almost completely saturated atmosphere, and means for cooling said atmosphere with said compound injected therein to a second temperature that is situated between said first temperature and the temperature of said liquid composition in said degasifying chamber, thereby to completely saturate said atmosphere with water vapour.

Preferred features, any one or more of which may be employed in the apparatus according to the present invention are as follows.

The apparatus comprises two deaerating chambers mounted in succession, and said chambers are so arranged that the current of said atmosphere through said chambers occurs in the same direction as the flow of the liquid composition through said chambers.

The deaerating chamber, or both deaerating chambers in the case the apparatus comprises two deaerating chambers, is, or are, provided with wall means serving as a barrier to prevent displacement of foam to one end of the chamber(s). For example there may be wall means which extend upwardly in said chamber(s) and which is or are normal or at least transverse to the direction of flow of the liquid composition through said chamber(s) and said wall means may extend partly below and partly above the liquid level. For example, the major part of said wall means may be below the level of the liquid composition in said chamber(s) and the minor part above the level of said liquid composition and such major, lower portion of the wall means may be perforated to permit the flow of liquid composition through the chamber(s). The minor, upper portion of said wall means will preferably be substantially unperforated to prevent or to substantially hinder movement of foam at the free surface of the liquid composition in the direction of flow of said composition through said chamber(s).

Figure 2:
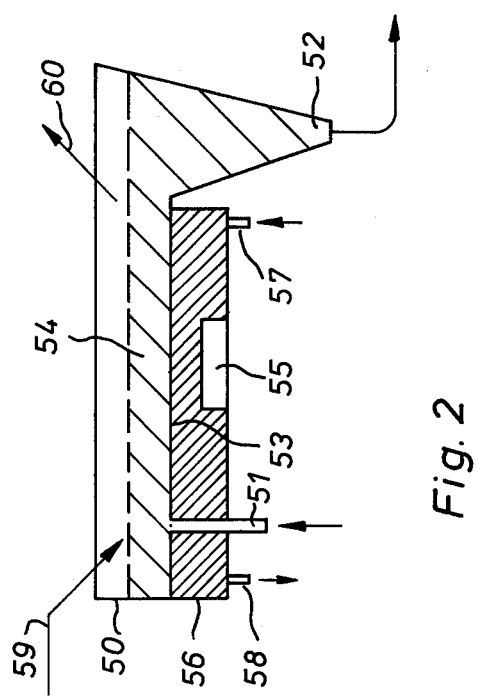

The invention will hereinafter be described by way of example with reference to the accompanying drawings, wherein:

FIG. 1 is a diagrammatic view of an arrangement for carrying out the method according to the invention, FIG. 2 is a diagrammatic view of another embodiment of a deaerating chamber for use in the arrangement of FIG. 1.

Referring to FIG. 1, the apparatus comprises two deaerating chambers 10 and 11 wherein ultrasonic transducers 12 and 13 are mounted, and a device 14 wherein a foam controlling atmosphere is produced.

The liquid composition which has to be deaerated is drawn from a supply 15 thereof and flows through a valve 16 to the first deaerating chamber 10. The partly deaerated liquid composition leaves the chamber at the opposite wall at the lower side, and flows then through the second chamber 11 which may be identic to the first chamber. A positive displacement type pump 17, such as a gear pump, pumps deaerated coating liquid to a coating station 18 where the coating composition is evenly spread over the desired coating width, and then becomes applied to a film or paper support that is continuously advanced past the station. The coating station may comprise any coater known in the art such as an air knife coater, an extrusion coater, a cascade coater, etc.

Between the pump 17 and the coating station 18 there may be provided an adjustable valve 19 for controlling the rate of flow of the liquid composition fed to the station 18. The valve 19 may be automatically adjusted in response to the signal of a flow meter so that the amount of coating composition applied per square meter of the travelling support may be controlled accurately. The difference in amount of liquid composition that is forwarded by the pump 17 and that is passed by the controlled valve 19, is returned to the input of the deaerating circuit through an overpressure valve 22. The arrestment of the coating is controlled by a hand-operated valve 23.

The level 24 of the coating composition in the communicating deaerating chambers 10 and 11 is kept constant by means of the valve 16 that is controlled by a controller 25 that is responsive to the signal from a liquid level sensor 26.

The device 14 comprises the following elements. A small chamber 30 open at the top side is provided with level control means 31, 32 and 33 for keeping the liquid, that is drawn from a supply 34, at a constant level in the chamber. The chamber 30 communicates with a closed chamber 35, that is provided with heating means 36 which may comprise electrical resistors or a liquid spiral for heated water or oil, and which means is thermostatically controlled to heat the liquid in the chamber 35 to a constant temperature. At its bottom wall the chamber 35 has a connection for pressurized air which is fed from a supply 37 and the pressure of which is controlled by a pressure valve 38. The air that passes through the body of liquid in the chamber 35 is almost completely saturated with said liquid as it reaches the free space above the liquid in the chamber. By the same passing step, the air has been cleaned from oil and dust. While remaining in said free space, the air laden with vapour is mixed with a compound that has a foam-stability reducing power on the liquid composition foam that is formed in the deaerating chambers 10 and 11.

The mentioned compound is provided as a liquid in a vessel 40 which is pressurized by air that may be drawn from the supply of pressurized air 37 via a valve 41. A valve 42 permits to accurately set the rate of flow of the mentioned liquid which will take its gas phase by dropping into the heated liquid contained in the chamber 35.

The vapour current thus produced is led to the deaerating chambers via a conduit 43 that offers no notable flow resistance for the mentioned current, but that has a first upwardly extending section 44 that is not thermally insulated, and a second downwardly extending section 45 that is preferably thermally insulated as indicated by the broken lines. The purpose of this particular configuration of the conduit is to slightly cool the vapour current as it leaves the chamber 35. The liquid which is occasionally in excess after the complete saturation of the vapour current may flow back to the chamber 35 along the wall of said upwardly extending section of the conduit 43. In the easiest way the described slight cooling of the vapour current may occur by the environmental air which usually will always have a temperature that is lower than the temperature of the vapour current in the chamber 35.

The insulation of the section 45 of the conduit 43 is preferred in order to not further cool the vapour current while flowing towards the deaerating chambers. As a matter of fact, any further cooling will cause condensation of the liquid taken up by the vapour current, and means such as a small collecting vessel 46 or the like may be required to collect such condensed liquid.

The following data illustrate the present embodiment of an apparatus in accordance with the present invention. Internal dimensions of the chambers 10 and 11:
  length: 80 cm
  width: 20 cm
  height: 50 cm
  Amount of liquid contained in a chamber: 25 l
  Free height above the level of the liquid in the chambers: 15 cm
  Transducer Philips PH 2152: Ferrite 20.3 kc/s
  Input power of ultrasonic energy of each transducer: 200 W.
  Liquid supply 34: demineralized water.
  Temperature of the liquid in the chamber 35: 70° C.
  Liquid in the tank 40: ethyl alcohol or octyl alcohol.
  Height of the conduit section 44: 2.5 meter.
  Temperature of the vapour current at the entrance of the deaerating chamber 10: 50° C.

The following examples illustrate the method according to the present invention.

EXAMPLE I

A light-sensitive aqueous silver halide photographic dispersion was applied to a subbed polyethylene terephthalate support, for the production of a radiographic film. The liquid composition was maintained at a temperature of 36° C., during the flow through the deaerating apparatus and the coating installation. The viscosity of the composition was 13 cp at said temperature. The coating occurred at a rate of 5 liters of liquid coating composition per min.

Foam formation in the deaerating chambers was kept under control by means of the installation described hereinbefore, an air stream that was saturated with water vapour at a temperature of 50° C. was passed in succession through the chambers 10 and 11, at a rate of 34 liters/min. As foam controlling compound there was added to the air current ethyl alcohol at a rate of 0.75 ml/min. Considering the total free surface (that is 3200 sq.cm) of the liquid composition in the two deaerating chambers, the mentioned rate of flow can also be expressed as 3/12800 ml of ethyl alcohol per min per sq.cm of free surface of the liquid composition in the deaerating chambers. The atmosphere in the chambers 10 and 11 had an overpressure of less than 5 mm of water column in the operation of the apparatus; the consumption of electrical energy of the complete deaerating installation was 4 kWh.

In the operation of the apparatus, the cushion of foam in the chamber 10 reached an average thickness of 2 mm, whereas the foam cushion in the chamber 11 was reduced to a very thin layer, which was even no longer coherent near the exit of said chamber at the right hand side according to the drawing. The operation of the ultrasonic transducers 12 and 13 was such that only the entrained gas of the liquid composition was removed. On the contrary, the dissolved gas of the liquid composition was not removed, since the total power input per unit of liquid passed through the apparatus was largely insufficient therefor.

The radiographic film made in accordance with the described method was completely free of pinholes or any other defect that would normally be attributed to an insufficient deaeration of the liquid composition. The air stream leaving the chamber 11 was discharged through a conduit 47 in the open air.

EXAMPLE II

An antihalation layer was applied to the reverse side of a subbed polyethylene terephthalate support in the production of a panchromatically sensitized graphic film with steep gradation. The liquid composition had a viscosity of 26.6 cPs at 36° C. and was coated at a rate of 5 l of liquid composition per min. Foam formation was controlled by means of an air stream of 70° C. that was saturated with water vapour, and that was passed through the chambers 10 and 11 at a rate of 34 liters/min. As foam controlling compound there was added to the air stream octyl alcohol at a rate of 0.075 ml/min. Considering the total free surface of the coating composition in the two deaerating chambers, the mentioned rate of flow amounts to 3/128000 ml of octyl alcohol per min per sq.cm of free surface of the liquid composition in the deaerating chamber.

The atmosphere in the chambers 10 and 11 had an overpressure of less than 5 mm of water column in the operation of the apparatus; the total consumption of electrical energy of the complete deaerating installation was 4 kWh. The vapour pressure of octyl alcohol, which is solely dependent on the number of ml of liquid octyl alcohol per unit of time added to vessel 35 and the amount of air passed through the chambers 10 and 11 at the specified temperature is always chosen in such a way that it suffices to destroy the foam generated in and displaced to the surface of the coating liquid. It has been found that the vapour pressure should increase with foam stability, proper to the liquid composition, and with the amount of air entrained in the flow of this liquid composition.

The coated and dried antihalation layer was free of any of such defects that are typical for gas entrained in the liquid composition.

The foam control as described in the foregoing examples could go on without any further adjustment of the installation during several days.

When the supply of alcohol in the tank 40 had to be renewed, it was shown that the release of the air pressure from the tank 40, the opening of said tank and replenishing with new liquid, in the present case about 6 liters of alcohol, and the resetting of the air pressure in the tank did not have an unsatisfactory influence on the foam control. During the described interruption, in the present case a period of 10 min, the increase in volume of the foam cushion in the deaerating chambers was negligibly small.

In the operation of the described apparatus, it was found that in certain cases there was a tendency for the foam cushion to be displaced in the direction of the flow of the liquid composition through the deaerating chambers, in the present figure from the left towards the right hand side according to the drawing. Thus, it could occur that a pile of foam was formed near the outlet side of the chamber whereas at the inlet side of the chamber there was much less foam formation. The mentioned phenomenon was attributed to two causes. First, entrainment of the foam by the flow of the liquid composition through the deaerating chambers; second, movement of the cushion of foam over the free surface of the liquid composition under the influence of the vapour current.

It was found that an improved foam control was obtained after the deaerating chambers were provided with vertical walls such as 48 and 49. These walls were metal plates that were fitted to the lateral walls of the deaerating chambers and that did not touch the ultrasonic transducers. Said walls were provided with a plurality of perforations in their surface that extended below the level 24 of the liquid in the chambers. The total surface of said perforations was sufficiently high to not cause a noticeable pressure drop over these perforations. The portion of the walls that extended above the level of the liquid in the chambers was not perforated. In the described embodiment, the height of said extending portions was 2 cm, and it was considered that this height could amount to about ⅓ of the free height above the liquid level in the chambers for a satisfactory operation.

It will be understood that the present invention is not limited to the examples disclosed hereinbefore.

The ethyl and octyl alcohol that have been used in the examples hereinbefore as a compound with foam-stability destroying power, may be used in other concentrations, and it has been shown that, in dependence on the characteristics of the coating composition being deaerated, concentrations between 1/128000 and 10/128000 ml of octyl alcohol per min per sq.cm and between 1/128000 and 10/128000 ml of ethyl alcohol per min per sq.cm of free surface of the liquid composition could be applied successfully.

Further, the ethyl and octyl alcohol described hereinbefore may be replaced by other chemicals that may reduce the foam stability such as fatty acids, esters, ethers, polyoxy alkenes, silicones, pH-effects by using gaseous acids or bases, provided they do not impair the physical or chemical properties of the particular liquid or coating composition that must be deaerated.

The free height above the level of the liquid composition in the deaerating chambers may be considerably greater than the height of 15 cm mentioned on page 11 hereinbefore. It will be understood that in such case the efficiency of the vapour current on the foam cushion will be less, and therefore it may be desirable to provide in such case means for creating an internal circulation of the vapour current in the space of the chamber above the level of the body of liquid composition.

Finally, the deaerating chamber or chambers may have a construction that differs from the one illustrated in FIG. 1. Such a differing construction is shown in FIG. 2 wherein a deaerating chamber 50 has an inlet 51 for a liquid composition to be aerated, and an outlet 52 that is disposed at a point well below the bottom wall 53 of the chamber that generates ultrasonic vibrations in the body 54 of liquid composition in the chamber. An ultrasonic transducer 55 is mounted in a separate chamber 56, the upper wall of which is constituted by the bottom wall 53 of the deaerating chamber 50. The chamber 56 has an inlet 57 and an outlet 58 for water that may be continuously circulated through the chamber and the temperature of which is preferably thermostatically controlled. The inlet and outlet for the foam controlling atmosphere in the deaerating chamber 50 are designated by the respective numerals 59 and 60. The construction of the complete unit was made out of stainless steel, and it was shown that the described embodiment enabled a very good transfer of the energy from the ultrasonic transducer element 55 to the liquid composition 54, as well as a good control of the temperature of the liquid in the deaerating chamber. Moreover, the mounting of the transducer in a separate chamber enables the easy replacement thereof in the case of defect, and leaves more freedom in the design of the deaerating chamber 50 so that this may have, for instance, a concave form for its bottom wall so that dead corners may be avoided, and cleaning may be facilitated.

We claim:

1. In a method for continuously degasifying a liquid composition including at least one liquid and having a gas entrained therein, by feeding the liquid composition through a degasifying chamber at a rate such that the level of the upper surface of the composition remains spaced away from the upper extremity of the chamber, and subjecting said liquid composition while in said chamber to ultrasonic vibration, thereby to move at least some of the entrained gas in the liquid composition upwardly towards the free surface of said composition in said chamber with a consequential formation of a head of foam above said free surface, the improvement of controlling the formation of said foam head at the free surface of said composition in said chamber, by maintaining at the free surface of the liquid composition in said chamber a vapour current of at least one of the solvents contained in the liquid composition, said current containing at least one compound in vapour phase that has a foam-stability reducing action on the foam formed at the free surface of the composition during the ultrasonic treatment, the temperature of said vapour current being such that no cooling of the liquid composition occurs.

2. Method according to claim 1, wherein said vapour current is saturated with water vapour.

3. Method according to claim 1, wherein the temperature of said vapour current is between 50° and 70° C.

4. Method according to claim 1, wherein the liquid composition is fed in succession through two degasifying chambers in each of which the composition takes a level such that the upper surface of the composition remains separated from the upper extremity of the chamber, and the liquid composition is subjected to ultrasonic vibrations, said vapour current is passed in succession over the free surfaces of the liquid compositions in both degasifying chambers, and the amount of said foam-controlling compound in the vapour current is such that the head of foam is reduced but not destroyed, while the thickness of the cushion of foam in the second chamber is substantially reduced to zero.

5. Method according to claim 1 wherein said liquid composition is subjected to ultrasonic vibrations to such an extent that the entrained gas but not the occasionally dissolved gas, in the liquid composition is moved upwardly towards the free surface of said composition.

6. Method according to claim 1, wherein the temperature of said vapour current is at least equal to the temperature of the liquid composition at the moment said vapour current is first brought into contact with said liquid composition foam.

7. Method according to claim 6, wherein the rature of said vapour current is between 5° and 25° C. higher than the temperature of the liquid composition in said chamber.

8. Method according to claim 1, wherein foam-stability reducing compound is octyl alcohol.

9. Method according to claim 8, wherein the rate at which said alcohol is passed over the liquid composition in said chamber, ranges between 1/128000 and 10/128000 ml per sq.cm of free surface of the liquid composition.

10. Method according to claim 1, wherein foam-stability reducing compound is ethyl alcohol.

11. Method according to claim 8, wherein the rate at which said alcohol is passed over the liquid composition in said chamber ranges between 1/128000 and 10/128000 ml per min per sq.cm of free surface of the liquid composition.

12. Apparatus for continuously degasifying a liquid composition including at least one solvent and containing gas entrained therein comprising:
at least one degasifying chamber provided with means for subjecting liquid within said chamber to ultrasonic vibrations, thereby to move entrained gas in the composition upwardly towards the top of said chamber,
level control means for supplying said liquid disposition to said chamber for controlling said supplying means associated with said chamber to supply an amount of composition less than the volume of the chamber so that the upper surface of the composition remains spaced away from the top of the chamber,
means for producing an atmosphere of at least one of the solvents contained in the liquid composition,
means for adding to said atmosphere a controlled amount of a compound that has a foam-stability reducing effect on said liquid composition foam, and
means for delivering through the free space between said surface of said liquid composition and the top of said chamber a current of said atmosphere containing said foam-stability reducing compound.

13. Apparatus according to claim 12, wherein said means for subjecting said liquid composition to ultrasonic vibrations comprises an ultrasonic transducer mounted in a chamber connected through a common wall with the degasifying chamber and that, in operation, is filled with a liquid for the temperature control of the degasifying chamber.

14. Apparatus according to claim 12, wherein said means for producing said atmosphere comprises means for moistening pressurized air with water vapour to near saturation at a first temperature that is higher than the temperature of the liquid composition in said degasifying chamber, injection means for injecting said compound having a foam-stability reducing effect into said near saturated atmosphere, and means for cooling said atmosphere with said compound injected therein to a second temperature that is situated between said first temperature and the temperature of said liquid composition in said degasifying chamber, thereby to completely saturate said atmosphere with water vapour.

15. Apparatus according to claim 12, wherein said degasifying chamber includes baffle means to prevent displacement of foam to one end of the chamber.

16. Apparatus according to claim 15, wherein said baffle means are normal to the direction of flow of the liquid composition through said chamber, and extend for the major portion of their height below the level of the liquid composition in said chamber and for the minor portion thereof above the level of said liquid composition; the said major, lower portion of said wall means being perforated to permit the liquid composition to flow through the chamber, and said minor, upper portion of said wall means being substantially unperforated to substantially hinder movement of foam at the free surface of the liquid composition in the direction of flow of said liquid composition through said chamber.

17. Apparatus according to claim 16, wherein the height of said upper portion of said wall means is less than ⅓ the height of the free space between the level of said liquid composition in said degasifying chamber and the top of said chamber.

* * * * *

UNITED STATES PATENT OFFICE
CERTIFICATE OF CORRECTION

Patent No. 4,127,394            Dated November 28, 1978

Inventor(s)  KAREL E. VERHILLE

It is certified that error appears in the above-identified patent and that said Letters Patent are hereby corrected as shown below:

In the Claims:

Claim 9, line 3, the comma after "chamber" should be deleted.

Claim 11, line 1, "8" should read -- 10 --.

Signed and Sealed this

Thirteenth Day of March 1979

[SEAL]

Attest:

RUTH C. MASON
Attesting Officer

DONALD W. BANNER
Commissioner of Patents and Trademarks